UNITED STATES PATENT OFFICE.

CHARLES S. BEDFORD, OF LEEDS, COUNTY OF YORK, ENGLAND.

COMPOUND DYE.

SPECIFICATION forming part of Letters Patent No. 409,384, dated August 20, 1889.

Application filed April 23, 1888. Serial No. 271,573. (No specimens.) Patented in England September 19, 1887, No. 12,667.

*To all whom it may concern:*

Be it known that I, CHARLES SAMUEL BEDFORD, a subject of the Queen of Great Britain, residing at Leeds, in the county of York, in the Kingdom of England, have invented certain new and useful Improvements in Coloring-Matters, (for which I have received Letters Patent in Great Britain, No. 12,667, dated September 19, 1887,) of which the following is a specification.

My invention has for its object the manufacture of yellow, orange, or brown coloring-matters from the combination of certain diazo compounds with the active principles of fustic, (yellow wood,) the chief varieties being known as "Cuba," "Tampico," "Corinto," "Maracaibo," "Vera Cruz," and "Jamaica" fustic; also with those contained in mahogany. The diazo compounds used in the manufacture of these coloring-matters are the salts—that is, the chloride, sulphate, nitrate, or sulphonic acids—of diazo-benzene, of diazo-toluene, of diazo-xylene, or of diazo-naphthalene.

The following is an illustration of the working of the process: In the preparation of the color from Jamaica fustic, five hundred pounds of the chipped or rasped wood are placed in a vat provided with a false bottom, and stripped by successive boilings with water of an hour's duration, with or without the addition of alkali or acid, preferably with about three per cent. of sodium carbonate (soda crystals) divided in the first two liquors. If more be used, the coloring-matter dyes a flatter shade. It generally requires six boils to strip the wood, and the successive liquors, after being strained by means of the false bottom, are pumped into a vat at a higher elevation, provided with a cooling-worm and agitator. When the temperature is reduced sufficiently low—say to 60° Fahrenheit—they are run together in a large open vat provided with stirrers. By this method of stripping the combined fustic liquors should measure about eight hundred and sixty gallons. About twenty-five pounds of aniline and about twenty-six and one-half pounds of concentrated sulphuric acid (in the form of aniline sulphate) are placed in an open tub containing one hundred and twenty gallons of cold water, standing above the fustic liquor. A solution of about twenty pounds sodium nitrite (ninety-eight per cent.) is then gradually run in with constant stirring till the sulphate is dissolved and the diazo-sulphate formed. This liquor is then run by a perforated pipe or other suitable means into the fustic liquor, which is kept constantly stirred while the coloring-matter forms. While the diazo liquor is being run in, alkali, preferably sodium carbonate, must be added to the fustic liquor, in order to bring about the required reaction. If the wood has been stripped with three per cent. of soda crystals, a gradual addition of about fifty pounds will be sufficient; but if plain water or acidified water has been used more will be required. If the coloring-matter does not entirely separate, a few pounds of sulphuric acid are added and the precipitate collected in a filter-press. The yield is six hundred and twenty-five pounds of a stiff paste, which may be used for dyeing in paste form, or it may be dried with the addition of a little alkali to make it soluble, and afterward ground. The toluene and xylene coloring-matters are produced in a similar manner.

To prepare the brown naphthalene color, about thirty-three pounds of naphthylamine are dissolved by boiling in about one hundred gallons of water acidified with about ninety-six pounds of hydrochloric acid, then cooled, and the liquor made up to two hundred gallons. It is then diazotized with about twenty-five pounds sodium nitrite. The fustic liquor is then treated with the above solution, as previously described.

In place of stripping the fustic by successive boilings, the extraction can be accomplished on the methodical principle, in which the fresh boiling water is caused to act on the nearly-exhausted wood, and then on less nearly-exhausted material, till it leaves the series or apparatus after acting on the hitherto untreated material. In such case, also, the material, as it gets more and more exhausted, meets with water less and less saturated till it is drawn out of the series through the newly-applied fresh boiling water. In this case the alkali is preferably added near the middle of the series. By this means more concentrated liquors may be obtained; but it is not advisable to use too strong extracts.